United States Patent
Combi et al.

(10) Patent No.: US 7,343,805 B2
(45) Date of Patent: Mar. 18, 2008

(54) SURFACE ACOUSTIC WAVE PRESSURE SENSOR

(75) Inventors: Chantal Combi, Oggiono (IT); Simona Petroni, Lecce (IT); Anna Angela Pomarico, Collepasso (IT); Lorenzo Baldo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/531,808

(22) Filed: Sep. 14, 2006

(65) Prior Publication Data
US 2007/0113658 A1   May 24, 2007

(30) Foreign Application Priority Data
Sep. 16, 2005 (EP) .................................. 05425648

(51) Int. Cl.
*G01L 11/00* (2006.01)
(52) U.S. Cl. .......................................... 73/702; 73/570
(58) Field of Classification Search ................. 73/570, 73/702, 703
See application file for complete search history.

(56) References Cited

U.S. PATENT DOCUMENTS

| 3,978,731 A | 9/1976 | Reeder et al. |
| 4,216,401 A | 8/1980 | Wagner |
| 5,212,988 A | 5/1993 | White et al. |
| 7,165,455 B2* | 1/2007 | Magee et al. .................. 73/650 |
| 2002/0115198 A1* | 8/2002 | Nerenberg et al. ....... 435/287.2 |
| 2005/0208696 A1 | 9/2005 | Villa et al. |
| 2006/0130585 A1* | 6/2006 | Magee et al. .................. 73/570 |

FOREIGN PATENT DOCUMENTS

| EP | 1505379 A1 | 2/2005 |
| JP | 63307326 | 12/1988 |

OTHER PUBLICATIONS

P.R. Chalker et al., "Fabrication of aluminium nitride/diamond and gallium nitride/diamond SAW devices," Diamond and Related Materials, vol. 8, 1999, pp. 309-313.

* cited by examiner

*Primary Examiner*—Andre Allen
(74) *Attorney, Agent, or Firm*—Lisa K. Jorgenson; Robert Iannucci; Seed IP Law Group PLLC

(57) ABSTRACT

A surface acoustic wave pressure sensor includes: a substrate and at least one flexible membrane, suspended over a cavity defined in the thickness of the substrate, the membrane being elastically deformable by a pressure applied by a fluid and being defined between a first surface facing the cavity and a second opposite surface; a SAW device comprising a layer of piezoelectric material arranged on the second surface of the membrane, the SAW device further comprising at least one SAW electro-acoustic transducer formed on one free surface of the piezoelectric layer. The piezoelectric layer is formed by deposition of piezoelectric material on the membrane and the substrate is integrated in a chip of semiconductor material, the membrane being a layer of the chip suspended over the cavity.

27 Claims, 1 Drawing Sheet

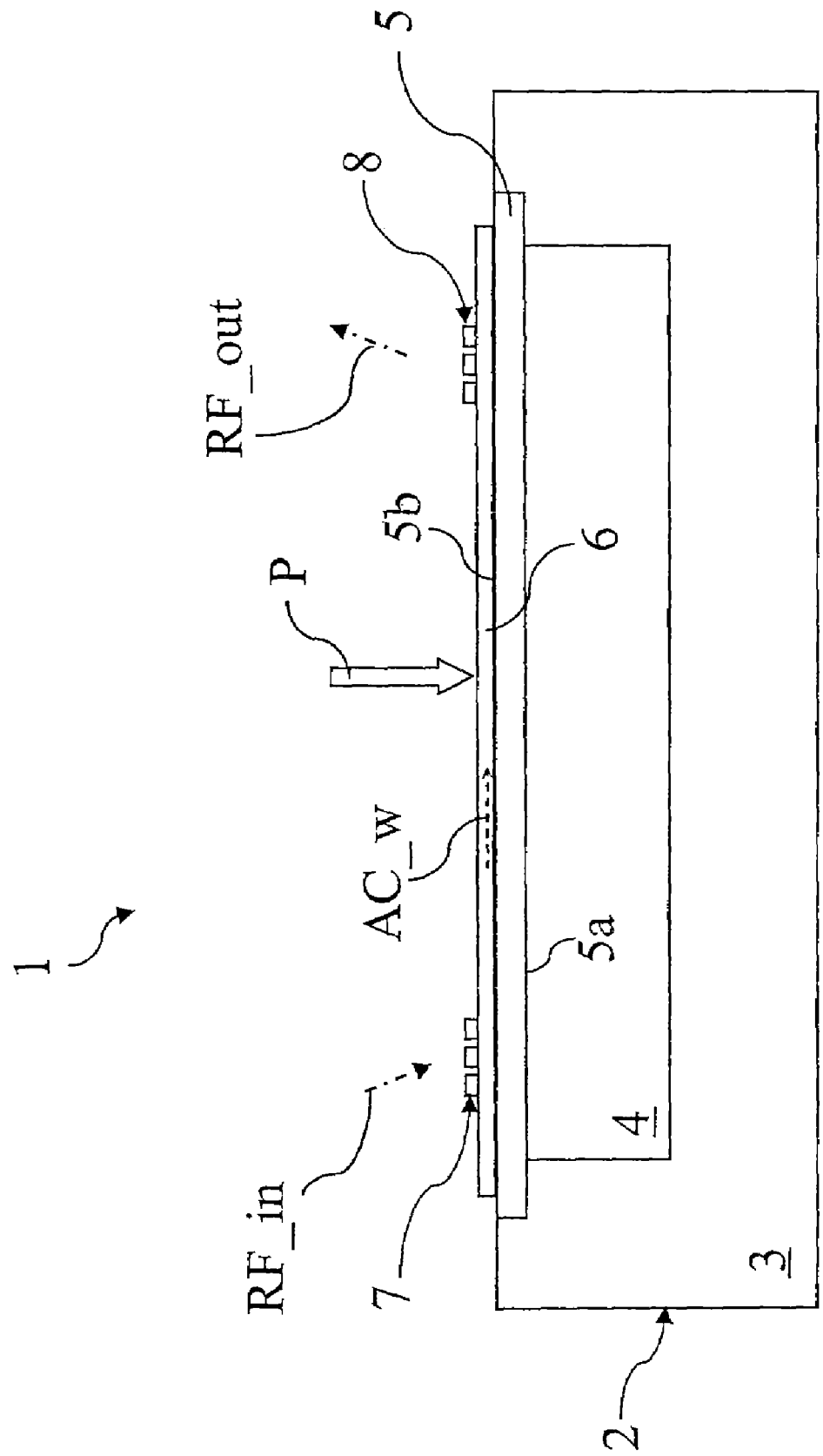

SURFACE ACOUSTIC WAVE PRESSURE SENSOR

BACKGROUND OF THE INVENTION

1. Field of the Invention

The present invention relates to the technical field of pressure sensors and more particularly to a pressure sensor of the surface acoustic wave type.

2. Description of the Related Art

To measure the pressure of a fluid, the use of pressure sensors comprising transducer elements with surface acoustic waves (SAW) or electro-acoustic transducers is generally known in the art. A particular sensor of this type is, for example, described in the U.S. Pat. No. 4,216,401 which relates in particular to a pressure sensor comprising a support structure in quartz which includes a bored cavity. The sensor comprises a flexible membrane which is coupled to the support structure in order to close the bored cavity on one side. One free surface of the flexible membrane includes one or more SAW electro-acoustic transducers with interdigital configuration electrodes. In one embodiment of the above-mentioned patent U.S. Pat. No. 4,216,401, the flexible membrane is made of piezoelectric material. In a second embodiment, the flexible membrane is made of non-piezoelectric material but a layer of piezoelectric material is deposited on the surface of the membrane.

BRIEF SUMMARY OF THE INVENTION

One embodiment of the present invention provides a pressure sensor which, compared to the pressure sensors described above and known in the art, has a more compact structure, can be formed by a simpler process and can be more easily integrated with other electronic devices, such as with other sensors.

BRIEF DESCRIPTION OF THE SEVERAL VIEWS OF THE DRAWING(S)

Further features and advantages of the present invention will become more apparent from the following detailed description of an exemplary but non-limiting embodiment thereof, as illustrated in the accompanying FIGURE which shows a schematic view of a transversal section of a pressure sensor according to one embodiment of the invention.

DETAILED DESCRIPTION OF THE INVENTION

The FIGURE shows an embodiment of a pressure sensor 1 according to the invention. The pressure sensor is, for example, a sensor which is not limited to, but can advantageously be used to measure the pressure, or the variation in pressure, of a fluid. For example, the pressure sensor 1 can be used to monitor the pressure of vehicle tire.

The pressure sensor 1 comprises a chip of semiconductor material, preferably monocrystalline silicon, comprising a substrate 3, of N or P type. A preferably blind cavity 4 is formed in the substrate 3, and may be of any of numerous shapes, such as cylindrical or parallelepiped.

The pressure sensor 1 further comprises a flexible or suspended membrane 5, or diaphragm, such as to close the top of the blind cavity 4 so as to form a chamber which, in the particular embodiment shown in the figure, is a closed chamber. The flexible membrane 5 is defined by a lower surface 5a facing the inside of the cavity 4 and an upper surface 5b opposite.

Advantageously, said flexible membrane 5 is integrated in the chip 2 of semiconductor material and is also made of semiconductor material, preferably in monocrystalline silicon.

Thanks to the presence of the cavity 4, the flexible membrane 5, which in practice represents a layer of silicon integrated in the chip of semiconductor material 2 and suspended above the cavity 4, is such that it can deform elastically following the application of a pressure force P on the membrane itself 5 by a fluid, such as air.

In a particularly preferred embodiment, the process to form the flexible membrane 5 integrated in the silicon substrate 3 and suspended above the cavity 4 of the thickness of the substrate 3, is in accordance with the teachings of the U.S. Published Patent Application No. 2005/208696, which is incorporated by reference herein in its entirety. In one embodiment, the membrane is an epitaxial layer of monocrystalline semiconductor material formed on the substrate 3 and over the cavity 4, as shown in the U.S. Published Patent Application No. 2005/208696.

Indifferently, the pressure sensor 1 can be an absolute pressure sensor, a relative pressure sensor or a differential pressure sensor. In the case the sensor 1 is an absolute pressure sensor, there is a vacuum inside the closed chamber defined by the blind cavity 4 and the flexible membrane 5. However, in the case the sensor 1 is a relative pressure sensor, there is a gas inside said chamber, hermetically introduced at a known reference pressure.

However, in the case the sensor 1 is a differential pressure sensor, the chamber will not be closed and the difference in pressure between 2 regions will be measured.

Advantageously, the pressure sensor 1 further comprises a layer of piezoelectric material 6 deposited on the upper surface 5b of the flexible membrane 5. In a particularly preferred embodiment, the thickness of the layer 6 of piezoelectric material is in the range of 100 nm and 5 μm and, more preferably, between approximately 250 nm and 2 μm.

In a particularly preferred embodiment, the piezoelectric material of the layer 6 is aluminum nitride (AlN), for example deposited by sputtering on the upper surface 5b of the flexible membrane 5.

In an alternative embodiment, the piezoelectric material of the layer 6 is gallium nitride (GaN), for example grown on the upper surface 5b of the membrane 5 by means of metal-organic vapor-phase deposition.

Advantageously, the pressure sensor 1 includes at least one SAW electro-acoustic transducer 7, 8 arranged on the free surface of the layer 6 of piezoelectric material such as to form, together with said layer 6, a SAW device 6, 7, 8. As is known, a SAW device comprises a layer of piezoelectric material (in this case, the layer 6) and comprises one or more electro-acoustic transducers (in this case indicated with 7, 8), having rows of metal electrodes arranged according to an interdigital configuration on one free surface of the layer of piezoelectric material. Preferably, said metal electrodes are formed on the free surface of the piezoelectric layer 6 by thin film deposition using standard photolithographic techniques.

The SAW device 6, 7, 8 is such as to convert a radio-frequency electromagnetic input wave RF_in into an acoustic wave AC_w (or Rayleigh wave) suitable to be propagated on the surface of the layer 6 of piezoelectric material and is such as to subsequently re-convert said surface acoustic wave AC_w into a radio-frequency electromagnetic output wave RF_out. Preferably, the electromagnetic input wave RF_in and the electromagnetic output wave RF_out have a central frequency range between 100 KHz and 5 GHz depending on the application.

In the particular embodiment illustrated in the figure, the SAW device is a passive device which can be interrogated via radio and in the form of a two-port delay line, including an interdigital input transducer 7, suitable to receive by wireless transmission a radio-frequency electromagnetic wave RF_in and convert it into an acoustic wave AC_w, and further comprising an interdigital output transducer 8 suitable to receive by wireless transmission the acoustic wave AC_w and convert it into a radio-frequency electromagnetic output wave RF_out. The input transducer 7 and the output transducer 8 are reciprocally arranged at a distance such that an expansion/compression region of the flexible and suspended membrane 5 is comprised between them. In this way, deformation (or movement) of the membrane 5 due to variation in the pressure P, modifying the state of stress of the piezoelectric layer 6, is such as to influence the propagation characteristics of the acoustic wave AC_w which travels between the interdigital input transducer 7 and the interdigital output transducer 8, and in particular such as to modify its propagation velocity along the surface of the piezoelectric layer 6. In accordance with the working principle of the SAW devices, said variation in the propagation velocity of the acoustic wave is such that it corresponds to a variation in the frequency of the output electromagnetic wave (RF-out), therefore making it possible to measure the pressure P.

It should be observed that the SAW device 6, 7, 8, can alternatively be formed as:
- a single-port delay line, including an input/output transducer and one or more reflectors;
- a resonator with an input port and an output port; and
- a resonator with a single input/output port.

The above-mentioned alternative embodiments may readily be devised by those skilled in the art on the basis of the teachings of the particular embodiment described above with reference to the figure.

From the above description, it can be understood how the pressure sensor 1 presents a very small and compact structure since it can be formed monolithically on a chip of semiconductor material. Advantageously, a pressure sensor can be integrated in this way with other sensors, for example with a temperature sensor formed on the same chip of semiconductor material, or with other integrated electronic devices.

Experimental tests have shown that the pressure sensor 1 further presents the advantage of being substantially insensitive to interferences due to electromagnetic pollution sources and of being practically insensitive to spurious accelerations. For these reasons, the pressure sensor 1 can be advantageously used in the automobile industry, for example as a tire pressure sensor.

Naturally, in order to satisfy contingent and specific requirements, a person skilled in the art may apply to the pressure sensor according to this invention many modifications and variations, all of which, however, are included within the scope of protection of the invention as defined by the following claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A surface acoustic wave (SAW) pressure sensor, comprising:
   a substrate having a cavity;
   a flexible membrane, suspended over the cavity, the membrane being elastically deformable by a pressure applied by a fluid and being defined between a first surface facing the cavity and an opposite second surface;
   a SAW device including a layer of piezoelectric material placed on said second surface of the membrane, the SAW device further comprising at least one SAW electro-acoustic transducer formed on a free surface of said piezoelectric layer;
   wherein said piezoelectric layer is a deposition of piezoelectric material on said membrane and said substrate is integrated in a chip of semiconductor material, the membrane being a semiconductor layer of said chip and suspended over said cavity.

2. A pressure sensor according to claim 1 wherein said cavity is a blind cavity and wherein said membrane is suspended over said cavity so as to form a closed chamber.

3. A pressure sensor according to claim 1 wherein said semiconductor material is silicon.

4. A pressure sensor according to claim 1 wherein said piezoelectric layer is a layer of aluminum nitride.

5. A pressure sensor according to claim 1 wherein said piezoelectric layer is a layer of gallium nitride.

6. A pressure sensor according to claim 1 wherein said piezoelectric layer has a thickness in a range of 100 nm and 5 μm.

7. A pressure sensor according to claim 6 wherein said piezoelectric layer has a thickness in a range of 250 nm and 2 μm.

8. A pressure sensor according to claim 1 wherein said cavity is cylindrical or parallelepiped in shape.

9. A pressure sensor according to claim 1 wherein said at least one electro-acoustic transducer includes a series of electrodes arranged according to an interdigital configuration, said electrodes being formed on said piezoelectric layer by thin film deposition.

10. A pressure sensor according to claim 1 wherein said SAW device is such as to convert a radio-frequency electromagnetic input wave into a surface acoustic wave suitable to be propagated on the free surface of the layer of piezoelectric material and such as to subsequently reconvert said surface acoustic wave into a radio-frequency electromagnetic output wave.

11. A pressure sensor according to claim 1 wherein said SAW device is a passive device which can be interrogated via radio.

12. A surface acoustic wave (SAW) pressure sensor, comprising:
    a semiconductor body including a monocrystalline substrate, having a cavity, and a flexible monocrystalline semiconductor membrane suspended over the cavity, the membrane being elastically deformable by a pressure applied by a fluid and having a first surface facing the cavity and an opposite second surface; and
    a SAW device including a piezoelectric layer on the second surface of the membrane, and a first SAW electro-acoustic transducer formed on a surface of the piezoelectric layer.

13. The pressure sensor of claim 12 wherein the membrane completely encloses the cavity within the substrate.

14. The pressure sensor of claim 12 wherein the substrate and membrane are formed of silicon.

15. The pressure sensor of claim 12 wherein the piezoelectric layer is a layer of aluminum nitride.

16. The pressure sensor of claim 12 wherein the piezoelectric layer has a thickness in a range of 100 nm and 5 μm.

17. The pressure sensor of claim 12 wherein the cavity is cylindrical or parallelepiped in shape.

18. The pressure sensor of claim 12 wherein the first SAW electro-acoustic transducer includes a series of electrodes arranged according to an interdigital configuration, the electrodes being formed on the piezoelectric layer by thin film deposition.

19. The pressure sensor of claim 12 wherein the SAW device includes a second SAW electro-acoustic transducer formed on the surface of the piezoelectric layer, the first SAW electro-acoustic transducer being structured to convert a radio-frequency electromagnetic input wave into a surface acoustic wave suitable to be propagated on the surface of the piezoelectric layer and the second SAW electro-acoustic transducer being structured to reconvert the surface acoustic wave into a radio-frequency electromagnetic output wave.

20. A surface acoustic wave (SAW) pressure sensor, comprising:
   a SAW device including a piezoelectric layer and a first SAW electro-acoustic transducer coupled to the piezoelectric layer; and
   a semiconductor body including a monocrystalline substrate, having a cavity, and a flexible epitaxial membrane suspended over the cavity, the membrane being elastically deformable by a pressure applied by a fluid and having a first surface facing the cavity and an opposite second surface, the SAW device being formed on the membrane.

21. The pressure sensor of claim 20 wherein the membrane completely encloses the cavity within the substrate.

22. The pressure sensor of claim 20 wherein the substrate and membrane are formed of silicon.

23. The pressure sensor of claim 20 wherein the piezoelectric layer is a layer of aluminum nitride.

24. The pressure sensor of claim 20 wherein the piezoelectric layer has a thickness in a range of 100 nm and 5 μm.

25. The pressure sensor of claim 20 wherein the cavity is cylindrical or parallelepiped in shape.

26. The pressure sensor of claim 20 wherein the first SAW electro-acoustic transducer includes a series of electrodes arranged according to an interdigital configuration, the electrodes being formed on the piezoelectric layer by thin film deposition.

27. The pressure sensor of claim 20 wherein the SAW device includes a second SAW electro-acoustic transducer coupled to the piezoelectric layer, the first SAW electro-acoustic transducer being structured to convert a radio-frequency electromagnetic input wave into a surface acoustic wave suitable to be propagated on a surface of the piezoelectric layer and the second SAW electro-acoustic transducer being structured to reconvert the surface acoustic wave into a radio-frequency electromagnetic output wave.

* * * * *